US010759982B2

(12) United States Patent
Shono et al.

(10) Patent No.: US 10,759,982 B2
(45) Date of Patent: Sep. 1, 2020

(54) REFRIGERATOR OIL

(71) Applicant: JXTG NIPPON OIL & ENERGY CORPORATION, Tokyo (JP)

(72) Inventors: Yohei Shono, Tokyo (JP); Akira Tada, Tokyo (JP); Yuya Mizutani, Tokyo (JP); Takeshi Okido, Tokyo (JP); Hidetoshi Ogata, Tokyo (JP)

(73) Assignee: JXTG NIPPON OIL & ENERGY CORPORATION, Tokyo (JP)

( * ) Notice: Subject to any disclaimer, the term of this patent is extended or adjusted under 35 U.S.C. 154(b) by 38 days.

(21) Appl. No.: 16/077,922

(22) PCT Filed: Feb. 15, 2017

(86) PCT No.: PCT/JP2017/005547
§ 371 (c)(1),
(2) Date: Aug. 14, 2018

(87) PCT Pub. No.: WO2017/145895
PCT Pub. Date: Aug. 31, 2017

(65) Prior Publication Data
US 2019/0078005 A1 Mar. 14, 2019

(30) Foreign Application Priority Data
Feb. 24, 2016 (JP) ................................. 2016-033436

(51) Int. Cl.
*C09K 5/04* (2006.01)
*C10M 169/04* (2006.01)
*C10M 171/00* (2006.01)
*C10N 20/00* (2006.01)
*C10N 40/30* (2006.01)

(52) U.S. Cl.
CPC ........... *C09K 5/044* (2013.01); *C10M 169/04* (2013.01); *C10M 171/008* (2013.01); *C09K 2205/122* (2013.01); *C09K 2205/126* (2013.01); *C09K 2205/24* (2013.01); *C10M 2207/026* (2013.01); *C10M 2207/042* (2013.01); *C10M 2207/2835* (2013.01); *C10M 2209/043* (2013.01); *C10M 2209/1085* (2013.01); *C10M 2211/022* (2013.01); *C10M 2223/041* (2013.01); *C10N 2020/099* (2020.05); *C10N 2040/30* (2013.01)

(58) Field of Classification Search
CPC .............. C09K 5/044; C09K 2205/126; C09K 2205/122; C09K 2205/24; C10M 171/008; C10M 169/04; C10M 2223/041; C10M 2207/026; C10M 2209/1085; C10M 2209/043; C10M 2207/042; C10M 2211/022; C10M 2207/2835; C10N 2220/301; C10N 2240/30; C10N 2020/099; C10N 2040/30
USPC ........................................... 252/68; 508/459
See application file for complete search history.

(56) References Cited

U.S. PATENT DOCUMENTS

| | | | | |
|---|---|---|---|---|
| 10,138,403 | B2 * | 11/2018 | Tasaka ..................... | C09K 5/04 |
| 2014/0077122 | A1 * | 3/2014 | Fukushima ............ | C09K 5/044 252/67 |
| 2014/0077123 | A1 * | 3/2014 | Fukushima ............ | C09K 5/044 252/67 |
| 2015/0337191 | A1 * | 11/2015 | Fukushima ............ | C09K 5/045 62/324.1 |
| 2016/0333241 | A1 * | 11/2016 | Fukushima ........ | C10M 171/008 |
| 2017/0044461 | A1 * | 2/2017 | Takahashi ............ | C10M 169/04 |
| 2019/0161701 | A1 * | 5/2019 | Shono .................. | C10M 169/04 |
| 2019/0194567 | A1 * | 6/2019 | Shono ................ | C10M 171/008 |

FOREIGN PATENT DOCUMENTS

| | | | |
|---|---|---|---|
| WO | 2012/157763 | 11/2012 | |
| WO | WO-2015125881 A1 * | 8/2015 | .......... C10M 171/02 |
| WO | 2015/163072 | 10/2015 | |
| WO | 2016/171256 | 10/2016 | |
| WO | 2016/171264 | 10/2016 | |

OTHER PUBLICATIONS

International Search Report in International Application PCT/JP2017/005547 dated Mar. 28, 2017.
International Preliminary Report on Patentability in International Application PCT/JP2017/005547 dated Aug. 28, 2018.

* cited by examiner

*Primary Examiner* — Douglas J McGinty
(74) *Attorney, Agent, or Firm* — Greenblum & Bernstein, P.L.C.

(57) ABSTRACT

The present invention provides a refrigerating machine oil comprising, as a base oil, at least one oxygen-containing oil having a carbon/oxygen molar ratio of 2.5 or more and 7.5 or less, and the refrigerating machine oil being used with a 1-chloro-2,3,3,3-tetrafluoropropene refrigerant.

14 Claims, No Drawings

REFRIGERATOR OIL

TECHNICAL FIELD

The present invention relates to a refrigerating machine oil, use of a composition containing at least one oxygen-containing oil as a base oil for a refrigerating machine oil, and use of a composition containing at least one oxygen-containing oil as a base oil for manufacturing a refrigerating machine oil.

BACKGROUND ART

Because of the problem of destruction of the ozone layer in recent years, CFC (chlorofluorocarbon) and HCFC (hydrochlorofluorocarbon), which have been used as a refrigerant for refrigerating equipment until now, are subject to regulation, and HFC (hydrofluorocarbon) is being used as a refrigerant in place of them. However, HFC-134a, which is normally used as a refrigerant for car air-conditioner, among HFC refrigerants has an ozone depletion potential of zero but has a high global warming potential (GWP), and thus is subject to regulation in Europe.

The development of a refrigerant which has a little influence on the ozone layer and a low GWP is urgently needed against such background. Patent Literature 1, for example, discloses using a 1-chloro-2,3,3,3-tetrafluoropropene refrigerant from the viewpoint of, for example, a little influence on the ozone layer and a little influence on global warming.

In the meantime, a refrigerating machine oil containing a hydrocarbon oil such as mineral oil or an alkylbenzene has been favorably used when conventional CFC and HCFC are used as a refrigerant; however, refrigerating machine oils have unexpected behavior such as compatibility with a refrigerant, lubricity, viscosity of a solution with a refrigerant, and thermal and chemical stability depending on the types of coexisting refrigerant, and thus the development of a refrigerating machine oil for each refrigerant is required.

CITATION LIST

Patent Literature

Patent Literature 1: WO 2012/157763

SUMMARY OF INVENTION

Technical Problem

An object of the present invention is to provide a refrigerating machine oil superior in suitability with a 1-chloro-2,3,3,3-tetrafluoropropene (HCFO-1224yd) refrigerant.

Solution to Problem

The present invention provides a refrigerating machine oil comprising as a base oil at least one oxygen-containing oil having a carbon/oxygen molar ratio of 2.5 or more and 7.5 or less, and being used with a 1-chloro-2,3,3,3-tetrafluoropropene refrigerant.

The present invention also provides a working fluid composition for a refrigerating machine comprising a refrigerating machine oil containing as a base oil at least one oxygen-containing oil having a carbon/oxygen molar ratio of 2.5 or more and 7.5 or less, and a 1-chloro-2,3,3,3-tetrafluoropropene refrigerant.

The above refrigerating machine oil preferably comprises as an oxygen-containing oil an ester of a fatty acid and a polyhydric alcohol, wherein a ratio of C4-20 fatty acids in the fatty acid is from 20 to 100% by mole.

The above refrigerating machine oil may further contain at least one additive selected from the group consisting of an acid scavenger, an antioxidant, an extreme-pressure agent, an oiliness agent, an antifoaming agent, a metal deactivator, an antiwear agent, a viscosity index improver, a pour-point depressant, a detergent dispersant, a friction modifier and a rust inhibitor.

It can be also said that the present invention is an use of a composition containing at least one oxygen-containing oil having a carbon/oxygen molar ratio of 2.5 or more and 7.5 or less as a base oil to a refrigerating machine oil or a working fluid composition for a refrigerating machine, wherein the refrigerating machine oil is used with a 1-chloro-2,3,3,3-tetrafluoropropene refrigerant and the working fluid composition for a refrigerating machine contains the refrigerating machine oil and a 1-chloro-2,3,3,3-tetrafluoropropene refrigerant.

It can be also said that the present invention is an use of a composition containing at least one oxygen-containing oil with a carbon/oxygen molar ratio of 2.5 or more and 7.5 or less as a base oil to produce a refrigerating machine oil or a working fluid composition for a refrigerating machine, wherein the refrigerating machine oil is used with a 1-chloro-2,3,3,3-tetrafluoropropene refrigerant, and the working fluid composition for a refrigerating machine contains the refrigerating machine oil and a 1-chloro-2,3,3,3-tetrafluoropropene refrigerant.

Advantageous Effects of Invention

According to the present invention, it is possible to provide a refrigerating machine oil superior in suitability with a 1-chloro-2,3,3,3-tetrafluoropropene (HCFO-1224yd) refrigerant.

DESCRIPTION OF EMBODIMENTS

The embodiment of the present invention will now be described in detail.

The refrigerating machine oil according to the present embodiment contains at least one oxygen-containing oil with a carbon/oxygen molar ratio of 2.5 or more and 7.5 or less as a base oil and is used with a 1-chloro-2,3,3,3-tetrafluoropropene refrigerant.

The working fluid composition for a refrigerating machine according to the present embodiment contains a refrigerating machine oil containing at least one oxygen-containing oil with a carbon/oxygen molar ratio of 2.5 or more and 7.5 or less as a base oil, and a 1-chloro-2,3,3,3-tetrafluoropropene refrigerant. It should be noted that an aspect containing the refrigerating machine oil according to the present embodiment and a 1-chloro-2,3,3,3-tetrafluoropropene refrigerant is encompassed in the working fluid composition for a refrigerating machine according to the present embodiment.

The base oil is at least one oxygen-containing oil with a carbon/oxygen molar ratio of 2.5 or more and 7.5 or less. Such carbon/oxygen molar ratio in an oxygen-containing oil is preferably 3.2 or more, more preferably 3.5 or more, further preferably 4.0 or more, particularly preferably 4.3 or more, and also preferably 5.8 or less, more preferably 5.2 or less, and further preferably 5.0 or less from the viewpoint of compatibility with a refrigerant and stability. The carbon/ oxygen molar ratio can be quantitatively analyzed by a common elemental analysis. As a method for analyzing carbon, there is a method in which carbon is exchanged into carbon dioxide by combustion and then analyzed by e.g. thermal conductivity method or gas chromatography. As a method for analyzing oxygen, a carbon reduction method in which the oxygen is exchanged into carbon monoxide using carbon and then quantitatively analyzed is common, and Shutze-Unterzaucher method is widely put to practical use.

The surface tension of the oxygen-containing oil is preferably 0.02 to 0.04 N/m, more preferably 0.025 to 0.035 N/m, further preferably about 0.03 N/m from the viewpoint that a refrigerating machine oil is efficiently circulated with a refrigerant in a refrigeration cycle. The surface tension in the present invention means a value measured in accordance with JIS K2241.

The oxygen-containing oil can be an ester, a polyvinyl ether, a polyalkylene glycol, a carbonate, a ketone, a polyphenyl ether, silicone, a polysiloxane, a perfluoroether and the like, and is preferably an ester, a polyvinyl ether or a polyalkylene glycol, and more preferably an ester.

As the ester, for example an aromatic ester, a dibasic acid ester, a polyol ester, a complex ester, a carbonic acid ester and mixtures thereof are provided as examples, and a polyol ester is preferably used.

As the aromatic ester, for example esters of a 1-6 valent, preferably 1-4 valent, more preferably 1-3 valent aromatic carboxylic acid and a C1-18, preferably C1-12 aliphatic alcohol are used. Specific examples of 1-6 valent aromatic carboxylic acids include benzoic acid, phthalic acid, isophthalic acid, terephthalic acid, trimellitic acid, pyromellitic acid and mixtures thereof and the like. Specific examples of C1-18 aliphatic alcohols include methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, octadecanol and mixtures thereof and the like. These C1-18 aliphatic alcohols can be linear or branched. A di- or more valent aromatic carboxylic acid can be a simple ester formed from an alcohol comprising one aliphatic alcohol, or a complex ester formed from an alcohol comprising two or more aliphatic alcohols.

As the dibasic acid ester, esters of a C5-10 dibasic acid such as glutaric acid, adipic acid, pimelic acid, suberic acid, azelaic acid or sebacic acid, and a C1-15 monohydric alcohol with a linear or branched alkyl group such as methanol, ethanol, propanol, butanol, pentanol, hexanol, heptanol, octanol, nonanol, decanol, undecanol, dodecanol, tridecanol, tetradecanol or pentadecanol, and mixtures thereof are preferably used.

The polyol ester is an ester synthesized from a polyhydric alcohol and a fatty acid. As the fatty acid, a saturated fatty acid is preferably used. The number of carbons in the fatty acid is preferably 4 to 20, more preferably 4 to 18, further preferably 4 to 9, and particularly preferably 5 to 9. The polyol ester can be a partial ester in which part of hydroxy groups in a polyhydric alcohol is not esterified and remains as hydroxy groups, a complete ester in which all hydroxy groups are esterified, or a mixture of a partial ester and a complete ester. The hydroxy value of the polyol ester is preferably 10 mg KOH/g or less, more preferably 5 mg KOH/g or less, and further preferably 3 mg KOH/g or less.

The ratio of C4-20 fatty acid in the fatty acid forming a polyol ester is preferably 20 to 100 mol %, more preferably 50 to 100 mol %, further preferably 70 to 100 mol %, and particularly preferably 90 to 100 mol %.

C4-20 fatty acids specifically include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid and icosanoic acid. These C4-20 fatty acids can be linear or branched. C4-20 fatty acids are preferably fatty acids which have a branch at the a position and/or β position, more preferably 2-methylpropanoic acid, 2-methylbutanoic acid, 2-methylpentanoic acid, 2-methylhexanoic acid, 2-ethylpentanoic acid, 2-methylheptanoic acid, 2-ethylhexanoic acid, 3,5,5-trimethylhexanoic acid, 2-ethylhexadecanoic acid and the like, and further preferably 2-ethylhexanoic acid or 3,5,5-trimethylhexanoic acid.

The fatty acid may contain fatty acids other than C4-20 fatty acids. Examples of fatty acids other than C4-20 fatty acids include C21-24 fatty acids, and specifically include linear or branched henicosanoic acid, linear or branched docosanoic acid, linear or branched tricosanoic acid, linear or branched tetracosanoic acid and the like.

As the polyhydric alcohol forming the polyol ester, a polyhydric alcohol having 2 to 6 hydroxy groups is preferably used. The number of carbons in the polyhydric alcohol is preferably 4 or more, more preferably 5 or more, and also preferably 12 or less, and more preferably 10 or less. Specifically, hindered alcohols such as neopentyl glycol, trimethylolethane, trimethylolpropane, trimethylolbutane, di-(trimethylolpropane), tri-(trimethylolpropane), pentaerythritol, and dipentaerythritol are preferred. The polyhydric alcohol is more preferably pentaerythritol, or a mixed alcohol of pentaerythritol and dipentaerythritol) because of particularly good compatibility with a refrigerant and hydrolytic stability.

The complex ester is an ester of at least two or more acids selected from monovalent fatty acids and dibasic acids, and a monohydric alcohol and/or a polyhydric alcohol, or an ester of a monovalent fatty acid and/or a dibasic acid, and at least two or more alcohols selected from monohydric alcohols and polyhydric alcohols. The complex ester can be an ester of a dibasic acid and at least two or more alcohols selected from monohydric alcohols and polyhydric alcohols. As the fatty acid, dibasic acid, monohydric alcohol, and polyhydric alcohol, the same compounds provided as examples in the descriptions of the dibasic acid ester and polyol ester can be used.

The carbonic acid ester is a compound having a carbonic acid ester structure represented by the following formula (A) in a molecule. The carbonic acid ester may contain one carbonic acid ester structure or a plurality of carbonic acid ester structures in one molecule.

[Chem. 1]

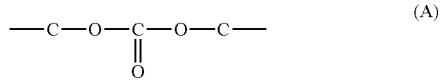

(A)

As an alcohol forming a carbonic acid ester, the above-described aliphatic alcohol and polyol for example can be used, and those in which a polyglycol is added to a polyglycol and a polyol can be also used. The carbonic acid ester can be also formed from carbonic acid and a fatty acid and/or a dibasic acid.

Among carbonic acid esters, a carbonic acid ester having a structure represented by the following formula (A-1) is preferred.

[Chem. 2]

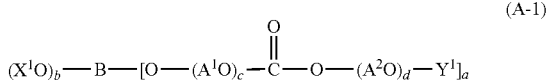
(A-1)

[In the above formula (A-1), $X^1$ represents a hydrogen atom, an alkyl group, a cycloalkyl group or a group represented by the following formula (A-2):

(A-2)

(in the above formula (A-2), $Y^2$ represents a hydrogen atom, an alkyl group or a cycloalkyl group, $A^3$ represents a C2-4 alkylene group, and e represents an integer from 1 to 50), $A^1$ and $A^2$, which may be the same or different, each represent a C2-4 alkylene group, $Y^1$ represents a hydrogen atom, an alkyl group or a cycloalkyl group, B represents a residue in a compound having 3 to 20 hydroxy groups, a represents an integer from 1 to 20, b represents an integer from 0 to 19, with the proviso that a+b=3 to 20, c represents an integer from 0 to 50, and d represents an integer from 1 to 50.]

In the above formula (A-1), $X^1$ represents a hydrogen atom, an alkyl group, a cycloalkyl group or a group represented by the above formula (A-2). The number of carbons in the alkyl group is not particularly restricted, and can be for example 1 to 24, and is preferably 1 to 18, and more preferably 1 to 12. The alkyl group can be linear or branched.

Specific examples of C1-24 alkyl groups include a methyl group, an ethyl group, an n-propyl group, an isopropyl group, an n-butyl group, an isobutyl group, a sec-butyl group, a tert-butyl group, a linear or branched pentyl group, a linear or branched hexyl group, a linear or branched heptyl group, a linear or branched octyl group, a linear or branched nonyl group, a linear or branched decyl group, a linear or branched undecyl group, a linear or branched dodecyl group, a linear or branched tridecyl group, a linear or branched tetradecyl group, a linear or branched pentadecyl group, a linear or branched hexadecyl group, a linear or branched heptadecyl group, a linear or branched octadecyl group, a linear or branched nonadecyl group, a linear or branched icosyl group, a linear or branched henicosyl group, a linear or branched docosyl group, a linear or branched tricosyl group, a linear or branched tetracosyl group and the like.

Specific examples of cycloalkyl groups include a cyclopentyl group, a cyclohexyl group, a cycloheptyl group and the like.

In the above formula (A-2), as the C2-4 alkylene group represented by $A^3$, an ethylene group, a propylene group, a trimethylene group, a butylene group, a tetramethylene group, a 1-methyltrimethylene group, a 2-methyltrimethylene group, a 1,1-dimethylethylene group, a 1,2-dimethylethylene group and the like are provided as examples.

$Y^2$ in the above formula (A-2) is a hydrogen atom, an alkyl group or a cycloalkylkyl group. The number of carbons in the alkyl group is not particularly restricted, and can be for example 1 to 24, and is preferably 1 to 18, and more preferably 1 to 12. The alkyl group can be linear or branched. Specific examples of C1-24 alkyl groups include groups provided in the description of $X^1$.

Specific examples of cycloalkyl groups include a cyclopentyl group, a cyclohexyl group, a cycloheptyl group and the like.

$Y^2$ is preferably a hydrogen atom or a C1-12 alkyl group, more preferably a hydrogen atom, a methyl group, an ethyl group, an n-propyl group, an iso-propyl group, an n-butyl group, an iso-butyl group, a sec-butyl group, a tert-butyl group, an n-pentyl group, an iso-pentyl group, a neo-pentyl group, an n-hexyl group, an iso-hexyl group, an n-heptyl group, an iso-heptyl group, an n-octyl group, an iso-octyl group, an n-nonyl group, an iso-nonyl group, an n-decyl group, an iso-decyl group, an n-undecyl group, an iso-undecyl group, an n-dodecyl group or an iso-dodecyl group.

$X^1$ is a hydrogen atom, preferably a C1-12 alkyl group or a group represented by the formula (A-2), more preferably a hydrogen atom, a methyl group, an ethyl group, an n-propyl group, an iso-propyl group, an n-butyl group, an iso-butyl group, a sec-butyl group, a tert-butyl group, an n-pentyl group, an iso-pentyl group, a neo-pentyl group, an n-hexyl group, an iso-hexyl group, an n-heptyl group, an iso-heptyl group, an n-octyl group, an iso-octyl group, an n-nonyl group, an iso-nonyl group, an n-decyl group, an iso-decyl group, an n-undecyl group, an iso-undecyl group, an n-dodecyl group, an iso-dodecyl group or a group represented by the formula (A-2).

The compound having 3 to 20 hydroxy groups having B as a residue specifically include the above-described polyol.

$A^1$ and $A^2$, which may be the same or different, each represent a C2-4 alkylene group. $A^1$ and $A^2$ each can be for example an ethylene group, a propylene group, a trimethylene group, a butylene group, a tetramethylene group, a 1-methyltrimethylene group, a 2-methyltrimethylene group, a 1,1-dimethylethylene group, a 1,2-dimethylethylene group and the like.

$Y^1$ is a hydrogen atom, an alkyl group or a cycloalkyl group. The number of carbons in the alkyl group is not particularly restricted, and is for example 1 to 24, preferably 1 to 18, and more preferably 1 to 12. The alkyl group can be linear or branched. Specific examples of C1-24 alkyl groups include groups provided in the description of $X^1$.

Specific examples of cycloalkyl groups include a cyclopentyl group, a cyclohexyl group, a cycloheptyl group and the like.

$Y^1$ is preferably a hydrogen atom or a C1-12 alkyl group, more preferably a hydrogen atom, a methyl group, an ethyl group, an n-propyl group, an iso-propyl group, an n-butyl group, an iso-butyl group, a sec-butyl group, a tert-butyl group, an n-pentyl group, an iso-pentyl group, a neo-pentyl group, an n-hexyl group, an iso-hexyl group, an n-heptyl group, an iso-heptyl group, an n-octyl group, an iso-octyl group, an n-nonyl group, an iso-nonyl group, an n-decyl group, an iso-decyl group, an n-undecyl group, an iso-undecyl group, an n-dodecyl group or an iso-dodecyl group.

In the above formulae (A-1) and (A-2), c, d and e each represent the polymerization degree of a polyoxyalkylene moiety. These polyoxyalkylene moieties may be the same or different in a molecule. When a carbonic acid ester has a plurality of different polyoxyalkylene moieties, the polymerization type of oxyalkylene groups is not particularly restricted, and can be random copolymerization or block copolymerization.

The polyvinyl ether has a structure unit represented by the following formula (1).

[Chem. 3]

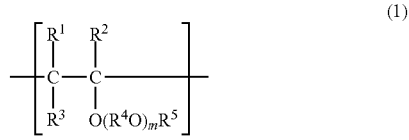
(1)

[In the formula, $R^1$, $R^2$ and $R^3$, which may be the same or different, each represent a hydrogen atom or a hydrocarbon group, $R^4$ represents a divalent hydrocarbon group or a divalent ether linked oxygen-containing hydrocarbon group, $R^5$ represents a hydrocarbon group, and m represents an integer of 0 or more. When m is 2 or more, a plurality of $R^4$ may be the same or different.]

The number of carbons in the hydrocarbon groups represented by $R^1$, $R^2$ and $R^3$ in the formula (1) is preferably 1 or more, more preferably 2 or more, further preferably 3 or more, and also preferably 8 or less, more preferably 7 or less, and further preferably 6 or less. At least one of $R^1$, $R^2$ and $R^3$ in the formula (1) is preferably a hydrogen atom, and all the groups are more preferably a hydrogen atom.

The number of carbons in the divalent hydrocarbon group and ether linked oxygen-containing hydrocarbon group represented by $R^4$ in the formula (1) is preferably 1 or more, more preferably 2 or more, further preferably 3 or more, and also preferably 10 or less, more preferably 8 or less, and further preferably 6 or less. The divalent ether linked oxygen-containing hydrocarbon group represented by $R^4$ in the formula (1) can be for example a hydrocarbon group having an oxygen forming an ether bond on a side chain.

$R^5$ in the formula (1) is preferably a C1-20 hydrocarbon group. This hydrocarbon group includes an alkyl group, a cycloalkyl group, a phenyl group, an aryl group, an arylalkyl group and the like. The hydrocarbon group is preferably an alkyl group, and more preferably a C1-5 alkyl group.

m in the formula (1) is preferably 0 or more, more preferably 1 or more, further preferably 2 or more, and also preferably 20 or less, more preferably 18 or less, and further preferably 16 or less. The average value of m in all structure units forming the polyvinyl ether is preferably 0 to 10.

The polyvinyl ether can be a homopolymer formed from one selected from structure units represented by the formula (1), a copolymer formed from two or more selected from structure units represented by the formula (1), or a copolymer formed from a structure unit represented by the formula (1) and another structure unit. When the polyvinyl ether is a copolymer, compatibility of a refrigerating machine oil with a refrigerant is satisfied and simultaneously for example lubricity, insulation properties, and hygroscopic properties can be further improved. At this time, the above various characteristics of a refrigerating machine oil can be made desirable by suitably selecting for example the type of monomer, a raw material, the type of initiator, and the ratio of structure units in the copolymer. Therefore, a refrigerating machine oil can be freely obtained depending on requirements such as lubricity and compatibility, which are different depending on for example the model of compressor, the material of lubricating section, refrigerating capacity and the type of refrigerant in a refrigerating system or an air-conditioning system. The copolymer can be a block copolymer or a random copolymer.

When the polyvinyl ether is a copolymer, the copolymer preferably has a structure unit (1-1) represented by the above formula (1) in which $R^5$ is a C1-3 alkyl group, and a structure unit (1-2) represented by the above formula (1) in which $R^5$ is an alkyl group having 3 to 20, preferably 3 to 10 and further preferably 3 to 8 carbon atoms. $R^5$ in the structure unit (1-1) is preferably an ethyl group, and $R^5$ in the structure unit (1-2) is preferably an isobutyl group. When the polyvinyl ether is a copolymer having the above structure units (1-1) and (1-2), the mole ratio of the structure unit (1-1) and the structure unit (1-2) is preferably 5:95 to 95:5, more preferably 20:80 to 90:10, and further preferably 70:30 to 90:10. When the mole ratio is within the above range, compatibility with a refrigerant can be further improved, and there is a tendency that hygroscopic properties can be reduced.

The polyvinyl ether can be one which is formed from only a structure unit represented by the above formula (1), but can be also a copolymer which further has a structure unit represented by the following formula (2). In this case, the copolymer can be a block copolymer or a random copolymer.

[Chem. 4]

[In the formula, $R^6$ to $R^9$, which may be the same or different, each represent a hydrogen atom or a C1-20 hydrocarbon group.]

The polyvinyl ether can be produced by polymerizing a vinylether monomer corresponding to the formula (1) or copolymerizing a vinylether monomer corresponding to the formula (1) and a hydrocarbon monomer having an olefin double bond corresponding to the formula (2). The vinylether monomer corresponding to the structure unit represented by the formula (1) is preferably a monomer represented by the following formula (3).

[Chem. 5]

[In the formula, $R^1$, $R^2$, $R^3$, $R^4$, $R^5$ and m represent the same definition as for $R^1$, $R^2$, $R^3$, $R^4$, $R^5$ and m in the formula (1) respectively.]

The polyvinyl ether preferably has the following terminal structure (A) or (B).

(A) A structure in which one terminal is represented by the formula (4) or (5) and another terminal is represented by the formula (6) or (7).

[Chem. 6]

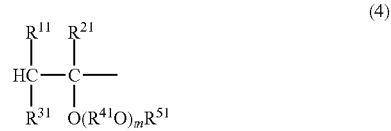

[In the formula, $R^{11}$, $R^{21}$ and $R^{31}$, which may be the same or different, each represent a hydrogen atom or a C1-8 hydrocarbon group, $R^{41}$ represents a C1-10 divalent hydrocarbon group or a divalent ether linked oxygen-containing hydrocarbon group, $R^{51}$ represents a C1-20 hydrocarbon group, and m represents the same definition as for m in the formula (1). When m is 2 or more, a plurality of $R^{41}$ may be the same or different]

[Chem. 7]

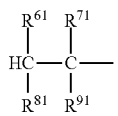
(5)

[In the formula, $R^{61}$, $R^{71}$, $R^{81}$ and $R^{91}$, which may be the same or different, each represent a hydrogen atom or a C1-20 hydrocarbon group.]

[Chem. 8]

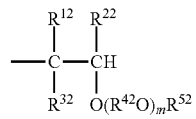
(6)

[In the formula, $R^{12}$, $R^{22}$ and $R^{32}$, which may be the same or different, each represent a hydrogen atom or a C1-8 hydrocarbon group, $R^{42}$ represents a C1-10 divalent hydrocarbon group or a divalent ether linked oxygen-containing hydrocarbon group, $R^{52}$ represents a C1-20 hydrocarbon group, and m represents the same definition as for m in the formula (1). When m is 2 or more, a plurality of $R^{41}$ may be the same or different.]

[Chem. 9]

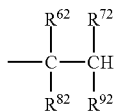
(7)

[In the formula, $R^{62}$, $R^{72}$, $R^{82}$ and $R^{92}$, which may be the same or different, each represent a hydrogen atom or a C1-20 hydrocarbon group.]

(B) A structure in which one terminal is represented by the above formula (4) or (5) and another terminal is represented by the following formula (8).

[Chem. 10]

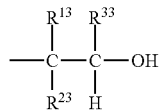
(8)

[In the formula, $R^{13}$, $R^{23}$ and $R^{33}$, which may be the same or different, each represent a hydrogen atom or a C1-8 hydrocarbon group.]

Among such polyvinyl ethers, polyvinyl ethers (a), (b), (c), (d) and (e) given below are particularly favorably used as the main component (base oil) of the refrigerating machine oil.

(a) A polyvinyl ether having a structure in which one terminal is represented by the formula (4) or (5) and another terminal is represented by the formula (6) or (7), wherein in the formula (1) all $R^1$, $R^2$ and $R^3$ are a hydrogen atom, m is an integer from 0 to 4, $R^4$ is a C2-4 divalent hydrocarbon group, and $R^5$ is a C1-20 hydrocarbon group.

(b) A polyvinyl ether having a structure which has only a structure unit represented by the formula (1) and in which one terminal is represented by the formula (4) and another terminal is represented by the formula (6), wherein in the formula (1) all $R^1$, $R^2$ and $R^3$ are a hydrogen atom, m is an integer from 0 to 4, $R^4$ is a C2-4 divalent hydrocarbon group, and $R^5$ is a C1-20 hydrocarbon group.

(c) A polyvinyl ether having a structure in which one terminal is represented by the formula (4) or (5) and another terminal is represented by the formula (8), wherein in the formula (1) all $R^2$ and $R^3$ are a hydrogen atom, m is an integer from 0 to 4, $R^4$ is a C2-4 divalent hydrocarbon group, and $R^5$ is a C1-20 hydrocarbon group.

(d) A polyvinyl ether having a structure which has only a structure unit represented by the formula (1) and in which one terminal is represented by the formula (5) and another terminal is represented by the formula (8), wherein in the formula (1) all $R^1$, $R^2$ and $R^3$ are a hydrogen atom, m is an integer from 0 to 4, $R^4$ is a C2-4 divalent hydrocarbon group, and $R^5$ is a C1-20 hydrocarbon group.

(e) A polyvinyl ether which is any of the above (a), (b), (c) and (d), and has a structure unit wherein $R^5$ in the formula (1) is a C1-3 hydrocarbon group and a structure unit wherein the $R^5$ is a C3-20 hydrocarbon group.

The weight average molecular weight of the polyvinyl ether is preferably 500 or more, more preferably 600 or more, and also preferably 3000 or less, more preferably 2000 or less, and further preferably 1500 or less. When the weight average molecular weight of the polyvinyl ether is 500 or more, lubricity in the coexistence of a refrigerant is good. When the weight average molecular weight is 3000 or less, the composition range showing compatibility with a refrigerant under low temperature conditions becomes wide, and poor lubrication in a refrigerant compressor and heat exchange inhibition in an evaporator can be suppressed.

The number average molecular weight of the polyvinyl ether is preferably 500 or more, more preferably 600 or more, and also preferably 3000 or less, more preferably 2000 or less, and further preferably 1500 or less. When the number average molecular weight of the polyvinyl ether is 500 or more, lubricity in the coexistence of a refrigerant is good. When the number average molecular weight is 3000 or less, the composition range showing compatibility with a refrigerant under low temperature conditions becomes wide, and poor lubrication in a refrigerant compressor and heat exchange inhibition in an evaporator can be suppressed.

The weight average molecular weight and number average molecular weight of the polyvinyl ether mean the weight average molecular weight and the number average molecular weight (in terms of polystyrene (standard sample)) respectively obtained by GPC analysis.

The weight average molecular weight and number average molecular weight can be measured for example as described below.

A solution with a sample concentration of 1 mass % is prepared by dilution using chloroform as a solvent. The sample solution is analyzed using a GPC apparatus (Waters Alliance 2695). The analysis is carried out at a solvent flow rate of 1 ml/min using a column which can analyze a molecular weight of 100 to 10000 and a refractive index detector. It should be noted that a relationship between column retention time and molecular weight is found using a polystyrene standard with a definite molecular weight, a calibration curve is separately created, and the molecular weight of a sample is determined from the obtained retention time.

There is a case where a side reaction is caused to form an unsaturated group such as an aryl group in a molecule in the production process for the polyvinyl ether; however, the polyvinyl ether is preferably a polyvinyl ether in which the unsaturation degree derived from an unsaturated group, etc. is low from the viewpoint of an improvement of thermal stability of polyvinyl ether itself, the suppression of sludge formation due to polymer formation, and the suppression of peroxide formation due to a decrease in antioxidative properties (oxidation prevention properties). The unsaturation degree of the polyvinyl ether is preferably 0.04 meq/g or less, more preferably 0.03 meq/g or less, and further preferably 0.02 meq/g or less. The peroxide value of the polyvinyl ether is preferably 10.0 meq/kg or less, more preferably 5.0 meq/kg or less, and further preferably 1.0 meq/kg. The carbonyl value of the polyvinyl ether is preferably 100 ppm by weight or less, more preferably 50 ppm by weight or less and further preferably 20 ppm by weight or less. The hydroxy value of the polyvinyl ether is preferably 10 mg KOH/g or less, more preferably 5 mg KOH/g or less and further preferably 3 mg KOH/g or less.

The unsaturation degree, peroxide value and carbonyl value each in the present invention indicate values measured by The JOCS Standard Methods for the Analysis of Fats, Oils and Related materials. That is, as the unsaturation degree in the present invention, a sample is allowed to react with Wijs solution (ICI-acetic acid solution), which is left in a dark place. Excessive ICI is then reduced to iodine, and iodine is titrated with sodium thiosulfate to calculate an iodine value. The unsaturation degree indicates a value (meq/g) obtained by converting this iodine value into vinyl equivalent. As the peroxide value in the present invention, potassium iodide is added to a sample, and the formed free iodine is titrated with sodium thiosulfate. The peroxide value indicates a value (meq/kg) obtained by converting this free iodine into the number of milliequivalents with respect to 1 kg of sample. As the carbonyl value in the present invention, 2,4-dinitrophenylhydrazine is acted on a sample to form chromogenic quinoid ion, and the absorbance of this sample at 480 nm is measured. The carbonyl value indicates a value (ppm by weight) obtained by converting the absorbance into the carbonyl amount based on a calibration curve found in advance using cinnamaldehyde as the standard substance. The hydroxy value in the present invention means a hydroxy value measured in accordance with JIS K0070:1992.

The polyalkylene glycol can be polyethylene glycol, polypropylene glycol, polybutylene glycol and the like. The structure unit of the polyalkylene glycol is for example oxyethylene, oxypropylene or oxybutylene. The polyalkylene glycol having these structure units can be obtained by ring-opening polymerization using ethylene oxide, propylene oxide and butylene oxide, monomers, respectively as a raw material.

The polyalkylene glycol includes a compound represented for example by the following formula (9).

$$R^{\alpha}-[(OR^{\beta})_f-OR^{\gamma}]_g \quad (9)$$

[In the formula (1), $R^{\alpha}$ represents a hydrogen atom, a C1-10 alkyl group, a C2-10 acyl group or a residue in a compound having 2 to 8 hydroxy groups, $R^{\beta}$ represents a C2-4 alkylene group, $R^{\gamma}$ represents a hydrogen atom, a C1-10 alkyl group or a C2-10 acyl group, f represents an integer from 1 to 80, and g represents an integer from 1 to 8.]

In the above formula (9), the alkyl groups represented by $R^{\alpha}$ and $R^1$ can be in any of the linear, branched and cyclic forms. The number of carbons in the alkyl group is preferably 1 to 10, and more preferably 1 to 6. When the number of carbons in the alkyl group is above 10, compatibility with a refrigerant tends to decrease.

The alkyl group moiety in the acyl groups represented by $R^{\alpha}$ and $R^{\gamma}$ can be in any of the linear, branched and cyclic forms. The number of carbons in the acyl group is preferably 2 to 10, and more preferably 2 to 6. When the number of carbons in the acyl group is above 10, compatibility with a refrigerant decreases and phase separation can be caused.

When both groups represented by $R^{\alpha}$ and $R^{\gamma}$ are an alkyl group or when both are an acyl group, the groups represented by $R^{\alpha}$ and $R^{\gamma}$ may be the same or different. When g is 2 or more, a plurality of groups represented by $R^{\alpha}$ and $R^{\gamma}$ in the same molecule may be the same or different.

When a group represented by $R^{\alpha}$ is a residue in a compound having 2 to 8 hydroxy groups, this compound may be in the chain form or the cyclic form.

In the polyalkylene glycol represented by the above formula (9), at least one of $R^{\alpha}$ and $R^{\gamma}$ is preferably an alkyl group, more preferably a C1-4 alkyl group, and further preferably a methyl group from the viewpoint of compatibility with a refrigerant.

Both $R^{\alpha}$ and $R^{\gamma}$ are preferably an alkyl group, more preferably a C1-4 alkyl group, and further preferably a methyl group from the viewpoint of thermochemical stability.

Either one of $R^{\alpha}$ and $R^{\gamma}$ is preferably an alkyl group, more preferably a C1-4 alkyl group, and further preferably a methyl group, and another one is a hydrogen atom from the viewpoint of ease of manufacture and costs. Both $R^{\alpha}$ and $R^{\gamma}$ are preferably a hydrogen atom from the viewpoint of lubricity and sludge-dissolving properties.

$R^{\beta}$ in the above formula (9) represents a C2-4 alkylene group. Such alkylene group includes an ethylene group, a propylene group, a butylene group and the like. The oxyalkylene group, a repeating unit represented by $OR^{\beta}$ includes an oxyethylene group, an oxypropylene group, and an oxybutylene group. The oxyalkylene group represented by $(ORl^{\beta})_f$ can be formed from one oxyalkylene group, or can be also formed from two or more oxyalkylene groups.

Among the polyalkylene glycols represented by the above formula (9), a copolymer containing an oxyethylene group (EO) and an oxypropylene group (PO) is preferably used from the viewpoint of compatibility with a refrigerant and viscosity-temperature characteristics. In this case, the ratio of oxyethylene group to the total of oxyethylene group and oxypropylene group (EO/(PO+EO)) is preferably 0.1 to 0.8 and more preferably 0.3 to 0.6 from the viewpoint of seizure load and viscosity-temperature characteristics. EO/(PO+BP) is preferably 0 to 0.5, more preferably 0 to 0.2, and further preferably 0 (i.e. a propylene oxide homopolymer) from the viewpoint of hygroscopic properties and thermal oxidative stability.

f in the above formula (9) represents the number of repeats (polymerization degree) of an oxyalkylene group $OR^{\beta}$ and is an integer from 1 to 80. g is an integer from 1 to 8. For example, when $R^{\alpha}$ is an alkyl group or an acyl group, g is 1. When $R^{\alpha}$ is a residue in a compound having 2 to 8 hydroxy groups, g is the number of hydroxy groups in the compound.

The average value of the product of f and g (f×g) is not particularly restricted and is preferably 6 to 80 from the viewpoint that the required performance as a refrigerating machine oil is satisfied in a balanced manner.

The weight average molecular weight of the polyalkylene glycol represented by the formula (9) is preferably 500 or more, more preferably 600 or more, and also preferably 3000 or less, more preferably 2000 or less, and further preferably 1500 or less. f and g in the formula (9) are preferably a number by which the weight average molecular weight of the polyalkylene glycol meets the above conditions. When the weight average molecular weight of the polyalkylene glycol is 500 or more, lubricity in the coexistence of a refrigerant is good. When the weight average molecular weight is 3000 or less, the composition range showing compatibility with a refrigerant under low temperature conditions becomes wide, and poor lubrication in a refrigerant compressor and heat exchange inhibition in an evaporator can be suppressed.

The number average molecular weight of the polyalkylene glycol represented by the formula (9) is preferably 500 or more, more preferably 600 or more, and also preferably 3000 or less, more preferably 2000 or less, and further preferably 1500 or less. f and g in the formula (9) are preferably a number by which the number average molecular weight of the polyalkylene glycol meets the above conditions. When the number average molecular weight of the polyalkylene glycol is 500 or more, lubricity in the coexistence of a refrigerant is good.

When the number average molecular weight is 3000 or less, the composition range showing compatibility with a refrigerant under low temperature conditions becomes wide, and poor lubrication in a refrigerant compressor and heat exchange inhibition in an evaporator can be suppressed.

The weight average molecular weight and number average molecular weight of the polyalkylene glycol mean the weight average molecular weight and the number average molecular weight (in terms of polypropylene glycol (standard sample)) respectively obtained by GPC analysis. The weight average molecular weight and number average molecular weight can be measured for example as described below.

A solution with a polyalkylene glycol concentration of 1 mass % is prepared by dilution using chloroform as a solvent. The solution is analyzed using a GPC apparatus (Waters Alliance 2695). The analysis is carried out at a solvent flow rate of 1 ml/min using a column which can analyze a molecular weight of 100 to 10000 and a refractive index detector. It should be noted that a relationship between column retention time and molecular weight is found using a polypropylene glycol standard with a definite molecular weight, a calibration curve is separately created, and the molecular weight of a sample is determined from the obtained retention time.

The hydroxy value of the polyalkylene glycol is preferably 100 mg KOH/g or less, more preferably 50 mg KOH/g or less, further preferably 30 mg KOH/g or less and particularly preferably 10 mg KOH/g or less.

The polyalkylene glycol can be synthesized using a known method ("Alkylene Oxide Polymer" Manta Shibata, et al., published by Kaibundo Publishing Co., Ltd. on Nov. 20, 1990). For example, one or more predetermined alkylene oxides are addition-polymerized to an alcohol ($R^\alpha OH$; $R^\alpha$ represents the same definition as for $R^\alpha$ in the above formula (9)), and moreover the terminal hydroxy group is etherified or esterified to obtain a polyalkylene glycol represented by the above formula (9). When two or more alkylene oxides are used in the above production process, the obtained polyalkylene glycol can be a random copolymer or block copolymer; however, the polyalkylene glycol is preferably a block copolymer from the viewpoint that oxidation stability and lubricity tend to be better, and is preferably a random copolymer from the viewpoint that low temperature fluidity tends to be good.

The kinematic viscosity at 100° C. of the polyalkylene glycol is preferably 5 mm$^2$/s or more, more preferably 6 mm$^2$/s or more, further preferably 7 mm$^2$/s or more, particularly preferably 8 mm$^2$/s or more, most preferably 10 mm$^2$/s or more, and also preferably 20 mm$^2$/s or less, more preferably 18 mm$^2$/s or less, further preferably 16 mm$^2$/s or less, particularly preferably 15 mm$^2$/s or less, and most preferably 15 mm$^2$/s or less. When the kinematic viscosity at 100° C. is 5 mm$^2$/s or more, lubricity in the coexistence of a refrigerant is good. When the kinematic viscosity at 100° C. is 20 mm$^2$/s or less, the composition range showing compatibility with a refrigerant becomes wide, and poor lubrication in a refrigerant compressor and heat exchange inhibition in an evaporator can be suppressed. The kinematic viscosity at 40° C. of the polyalkylene glycol is preferably 10 mm$^2$/s or more, more preferably 20 mm$^2$/s or more, and also preferably 200 mm2/s or less, and more preferably 150 mm$^2$/s or less. When the kinematic viscosity at 40° C. is 10 mm$^2$/s or more, lubricity and sealing properties for compressors can be secured. When the kinematic viscosity is above 200 mm$^2$/s, the composition range showing compatibility with a refrigerant under low temperature conditions becomes wide, and poor lubrication in a refrigerant compressor and heat exchange inhibition in an evaporator can be suppressed.

The pour point of the polyalkylene glycol is preferably −10° C. or lower, more preferably −20° C. or lower, and also preferably −50° C. or higher. When the pour point is −10° C. or lower, the solidification of a refrigerating machine oil in a refrigerant circulation system at a low temperature can be suppressed.

In the production process for the polyalkylene glycol represented by the above formula (9), there is a case where an alkylene oxide such as propylene oxide causes a side reaction to form an unsaturated group such as an aryl group in a molecule. When an unsaturated group is formed in a polyalkylene glycol molecule, a phenomenon, in which the thermal stability of the polyalkylene glycol itself decreases, a polymer is formed to form sludge, or antioxidative properties (oxidation prevention properties) decrease to form a peroxide, easily occurs. In particular, when a peroxide is formed, the peroxide is decomposed to form a compound having a carbonyl group, and the compound having a carbonyl group further forms sludge and capillary clogging easily occurs.

Therefore, as the polyalkylene glycol, a polyalkylene glycol in which the unsaturation degree derived from an unsaturated group, etc. is low is preferably used. The unsaturation degree of the polyalkylene glycol is preferably 0.04 meq/g or less, more preferably 0.03 meq/g or less, and further preferably 0.02 meq/g or less. The peroxide value is preferably 10.0 meq/kg or less, more preferably 5.0 meq/kg or less, and further preferably 1.0 meq/kg. The carbonyl value is preferably 100 ppm by weight or less, more preferably 50 ppm by weight or less and further preferably 20 ppm by weight or less.

In order to obtain a polyalkylene glycol with a low unsaturation degree, peroxide value and carbonyl value, reaction temperature when propylene oxide is allowed to react is preferably 120° C. or lower, and more preferably 110° C. or lower. When an alkali catalyst is used for production, by using an inorganic adsorbent such as activated carbon, activated white earth, bentonite, dolomite or aluminosilicate to remove the alkali catalyst, the unsaturation degree can be reduced. Also, an increase in the peroxide value or carbonyl value can be prevented by, when producing or using a polyalkylene glycol, avoiding contact to oxygen as much as possible, and adding an antioxidant.

The polyalkylene glycol is required to have a carbon/oxygen mole ratio within a predetermined range, and a polymer with a mole ratio within the range can be produced by selecting and adjusting the type of raw material monomer and mix ratio.

The base oil may further contain hydrocarbon oils such as mineral oil, an olefin polymer, a naphthalene compound and an alkylbenzene in addition to the above oxygen-containing oil. The amount of the above oxygen-containing oil contained is preferably 5 mass % or more, more preferably 30 mass % or more, and further preferably 95 mass % or more based on the total amount of base oil.

The refrigerating machine oil may further contain various additives as needed. Such additives include an acid scavenger, an antioxidant, an extreme-pressure agent, an oiliness agent, an antifoaming agent, a metal deactivator, an antiwear agent, a viscosity index improver, a pour-point depressant, a detergent dispersant, a friction modifier, a rust inhibitor and the like. The amount of additive contained is preferably 5 mass % or less and more preferably 2 mass % or less based on the total amount of refrigerating machine oil.

The refrigerating machine oil further contains preferably an acid scavenger among the above additives from the viewpoint that thermochemical stability is further improved. As the acid scavenger, an epoxy compound and a carbodiimide compound are provided as examples.

The epoxy compounds are not particularly restricted, and include a glycidyl ether epoxy compound, a glycidyl ester epoxy compound, an oxirane compound, an alkyloxirane compound, an alicyclic epoxy compound, an epoxidized fatty acid monoester, an epoxidized vegetable oil and the like. These epoxy compounds can be used individually or two or more epoxy compounds can be used in combination.

The glycidyl ether epoxy compounds can include n-butylphenylglycidyl ether, i-butylphenylglycidyl ether, sec-butylphenylglycidyl ether, tert-butylphenylglycidyl ether, pentylphenylglycidyl ether, hexylphenylglycidyl ether, heptylphenylglycidyl ether, octylphenylglycidyl ether, nonylphenylglycidyl ether, decylphenylglycidyl ether, decyl glycidyl ether, undecyl glycidyl ether, dodecyl glycidyl ether, tridecyl glycidyl ether, tetradecyl glycidyl ether, 2-ethylhexyl glycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, a polyallcylene glycol monoglycidyl ether, and a polyalkylene glycol diglycidyl ether.

The glycidyl ester epoxy compounds can include glycidyl benzoate, glycidyl neodecanoate, glycidyl-2,2-dimethyl octanoate, glycidyl acrylate and glycidyl methacrylate.

The alicyclic epoxy compound is a compound having a partial structure represented by the following formula (10) in which the carbon atoms forming the epoxy group directly form the alicyclic ring.

[Chem. 11]

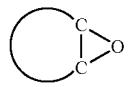

(10)

The alicyclic epoxy compounds can include 1,2-epoxycyclohexane, 1,2-epoxycyclopentane, 3',4'-epoxycyclohexylmethyl-3,4-epoxycyclohexane carboxylate, bis(3,4-epoxycyclohexylmethyl)adipate, exo-2,3-epoxynorbornane, bis(3,4-epoxy-6-methylcyclohexylmethy)padipate, 2-(7-oxabicyclo[4.1.0]hept-3-yl)-spiro(1,3-dioxane-5,3'-[7]oxabicyclo[4.1.0]heptane, 4-(1'-(methylepoxyethyl)-1,2-epoxy-2-methylcyclohexane and 4-epoxyethyl-1,2-epoxycyclohexane.

The allyloxirane compounds can include styrene oxide and an alkyl styrene oxide.

The alkyloxirane compounds can include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxymdecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,2-epoxyoctadecane, 1,2-epoxynonadecane and 1,2-epoxyicosane.

The epoxidized fatty acid monoesters can include an ester of a C12-20 epoxidized fatty acid, and a C1-8 alcohol, or phenol or an alkylphenol. As the epoxidized fatty acid monoester, butyl, hexyl, benzyl, cyclohexyl, methoxyethyl, octyl, phenyl and butylphenyl esters of epoxystearic acid are preferably used.

The epoxidized vegetable oils can include epoxy compounds of vegetable oils such as soybean oil, linseed oil and cottonseed oil.

The carbodiimide compounds are not particularly restricted, and for example a dialkyl carbodiimide, diphenyl carbodiimide, and a bis(alkylphenyl)carbodiimide can be used. The dialkyl carbodiimides can include diisopropyl carbodiimide, dicyclohexyl carbodiimide and the like. The bis(alkylphenyl)carbodiimides can include ditolylcarbodiimide, bis(isopropylphenyl)carbodiimide, bis(diisopropylphenyl)carbodiimide, bis(triisopropylphenyl)carbodiimide, bis(butylphenyl)carbodiimide, bis(dibutylphenyl)carbodiimide, bis(nonylphenyl)carbodiimide and the like.

The refrigerating machine oil further contains preferably an antiwear agent among the above additives. Examples of favorable antiwear agents include a phosphoric acid ester, a thiophosphoric acid ester, a sulfide compound and a zinc dialkyl dithiophosphate. Among phosphoric acid esters, triphenyl phosphate (TPP) and tricresyl phosphate (TCP) are preferably used. Among thiophosphoric acid esters, triphenyl phosphorothionate (TPPT) is preferably used. The sulfide compounds have various types; however, a monosulfide compound is preferably used from the viewpoint that the stability of refrigerating machine oil is secured and a change in quality of copper which is used in a large amount in the inside of refrigerating equipment can be suppressed.

The refrigerating machine oil further contains preferably an antioxidant among the above additives. As the antioxidant, there are a phenol compound such as di-tert-butyl-p-cresol, an amine compound such as an alkyldiphenylamine, and the like. In particular, the refrigerating machine oil contains a phenol compound as an antioxidant in preferably 0.02 mass % or more and 0.5 mass % or less based on the total amount of refrigerating machine oil.

The refrigerating machine oil further contains preferably a friction modifier, an extreme-pressure agent, a rust inhibitor, a metal deactivator or a antifoaming agent among the above additives. As the friction modifier, there are an aliphatic amine, an aliphatic amide, an aliphatic imide, an alcohol, an ester, a phosphoric acid ester amine salt, a phosphorous acid ester amine salt and the like. As the extreme-pressure agent, there are a sulfurized olefin, a sulfurized fat and oil, and the like. As the rust inhibitor, there is an ester or partial ester of an alkenyl succinic acid, and the like. As the metal deactivator, there are benzotriazole, a benzotriazole derivative, and the like. As the antifoaming agent, there are a silicone compound, a polyester compound, and the like.

The amount of base oil contained in the refrigerating machine oil is preferably 80 mass % or more, more preferably 90 mass % or more, and further preferably 95 mass % or more based on the total amount of refrigerating machine oil in order to provide good characteristics required for a refrigerating machine oil such as lubricity, compatibility, thermochemical stability and electrical insulation properties.

The kinematic viscosity at 40° C. of the refrigerating machine oil can be preferably 3 mm$^2$/s or more, more preferably 4 mm$^2$/s or more, further preferably 5 mm$^2$/s or more, and also preferably 1000 mm$^2$/s or less, more preferably 500 mm$^2$/s or less, and further preferably 400 mm$^2$/s or less. The kinematic viscosity at 100° C. of the refrigerating machine oil can be preferably 1 mm$^2$/s or more, more preferably 2 mm$^2$/s or more, and also preferably 100 mm$^2$/s or less, and more preferably 50 mm$^2$/s or less.

The volume resistivity of the refrigerating machine oil is not particularly limited, and can be preferably $1.0 \times 10^9$ Ω·m or more, more preferably $1.0 \times 10^{10}$ Ω·m or more, and further preferably $1.0 \times 10^{11}$ Ω·m or more. In particular, when the refrigerating machine oil is used for a hermetic refrigerating machine, there is a tendency that high electrical insulation properties are required. The volume resistivity in the present invention means a value at 25° C. measured in accordance with "Testing methods of electrical insulating oils" in JIS C2101:1999.

The amount of moisture contained in the refrigerating machine oil is not particularly limited, and can be preferably 200 ppm or less, more preferably 100 ppm or less, and most preferably 50 ppm or less based on the total amount of refrigerating machine oil. In particular, when the refrigerating machine oil is used for a hermetic refrigerating machine, it is required that the amount of moisture contained be small from the viewpoint of an influence on the thermochemical stability and electrical insulation properties of the refrigerating machine oil.

The acid value of the refrigerating machine oil is not particularly limited, and can be preferably 1.0 mg KOH/g or less and more preferably 0.1 mg KOH/g or less so as to prevent corrosion on metal used for a refrigerating machine or piping and, when an ester is contained in the refrigerating machine oil, prevent the decomposition of the ester. The acid value in the present invention means an acid value measured in accordance with "Petroleum products and lubricants-Determination of neutralization number" in JIS K2501: 2003.

The ash content in the refrigerating machine oil is not particularly limited, and can be preferably 100 ppm or less and more preferably 50 ppm or less so as to increase the thermochemical stability of the refrigerating machine oil and suppress the formation of e.g. sludge. The ash content in the present invention means an ash value measured in accordance with "Crude oil and petroleum products-Determination of ash and sulfated ash" in JIS K2272:1998.

The pour point of the refrigerating machine oil can be preferably −10° C. or less, more preferably −20° C. or less, and further preferably −30° C. or less. The pour point in the present invention means a pour point measured in accordance with JIS K2269.

A composition containing at least one of the above oxygen-containing oil with a carbon/oxygen molar ratio of 2.5 or more and 7.5 or less as a base oil, and a composition containing at least one of the above oxygen-containing oil with a carbon/oxygen molar ratio of 2.5 or more and 7.5 or less as a base oil and further containing the above various additives are favorably used as a constituent of a refrigerating machine oil which is used with a 1-chloro-2,3,3,3-tetrafluoropropene refrigerant, or a constituent of a working fluid composition for a refrigerating machine containing the refrigerating machine oil and a 1-chloro-2,3,3,3-tetrafluoropropene refrigerant.

A composition containing at least one of the above oxygen-containing oil with a carbon/oxygen mole ratio of 2.5 or more and 7.5 or less as a base oil, and a composition containing at least one of the above oxygen-containing oil with a carbon/oxygen mole ratio of 2.5 or more and 7.5 or less as a base oil and further containing the above various additives are favorably used for producing a refrigerating machine oil which is used with a 1-chloro-2,3,3,3-tetrafluoropropene refrigerant, or a working fluid composition for a refrigerating machine containing the refrigerating machine oil and a 1-chloro-2,3,3,3-tetrafluoropropene refrigerant.

The refrigerating machine oil according to the present embodiment is used with a 1-chloro-2,3,3,3-tetrafluoropropene (HCFO-1224yd) refrigerant, and favorably used particularly with a cis-1-chloro-2,3,3,3-tetrafluoropropene (HCFO-1224yd(Z)) refrigerant. The working fluid composition for a refrigerating machine according to the present embodiment contains a 1-chloro-2,3,3,3-tetrafluoropropene (HCFO-1224yd) refrigerant, and contains preferably a cis-1-chloro-2,3,3,3-tetrafluoropropene (HCFO-1224yd(Z)) refrigerant.

The 1-chloro-2,3,3,3-tetrafluoropropene (HCFO-1224yd) refrigerant can be any of cis-1-chloro-2,3,3,3-tetrafluoropropene (HCFO-1224yd(Z)), trans-1-chloro-2,3,3,3-tetrafluoropropene (HCFO-1224yd(E)) and a mixture thereof. The 1-chloro-2,3,3,3-tetrafluoropropene (HCFO-1224yd) refrigerant preferably contains cis-1-chloro-2,3,3,3-tetrafluoropropene (HCFO-1224yd(Z)) as the main component. The ratio of cis-1-chloro-2,3,3,3-tetrafluoropropene (HCFO-1224yd(Z)) to the 1-chloro-2,3,3,3-tetrafluoropropene (HCFO-1224yd) refrigerant is preferably 50 mol % or more, more preferably 70 mol % or more, further preferably 90 mol % or more, and particularly preferably 95 mol % or more, and can be 100 mol % (only cis-1-chloro-2,3,3,3-tetrafluoropropene (HCFO-1224yd(Z))).

The refrigerant which is used with the refrigerating machine oil according to the present embodiment, and the refrigerant contained in the working fluid composition for the refrigerating machine according to the present embodiment may further contain known refrigerants such as a saturated fluorohydrocarbon refrigerant and an unsaturated fluorohydrocarbon refrigerant in addition to 1-chloro-2,3,3,3-tetrafluoropropene (HCFO-1224yd). In this case, the amount of 1-chloro-2,3,3,3-tetrafluoropropene (HCFO-1224yd) contained is preferably 90 mass % or less, more preferably 60 mass % or less, further preferably 50 mass % or less, particularly preferably 40 mass % or less, and most preferably 20 mass % or less based on the total amount of refrigerant from the viewpoint of the stability of refrigerating machine oil under a refrigerant atmosphere. The amount of 1-chloro-2,3,3,3-tetrafluoropropene (HCFO-1224yd) contained is preferably 20 mass % or more, more preferably 40 mass % or more, further preferably 50 mass % or more, particularly preferably 60 mass % or more, and most preferably 90 mass % or more based on the total amount of refrigerant from the viewpoint of a reduction in GWR As the saturated fluorohydrocarbon refrigerant, one or a mixture of two or more selected from difluoromethane (HFC-32), pentafluoroethane (HFC-125), 1,1,2,2-tetrafluoroethane (HFC-134), 1,1,1,2-tetrafluoroethane (HFC-134a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa), and 1,1,1,3,3-pentafluorobutane (HFC-365mfc) is provided as an example. Among these, difluoromethane (HFC-32) and 1,1,1,2-tetrafluoroethane (HFC-134a) are preferably used from the viewpoint of the stability of refrigerating machine oil under a refrigerant atmosphere and a reduction in GWP.

As the unsaturated fluorohydrocarbon refrigerant, one or a mixture of two or more selected from 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), 3,3,3-trifluoropropene (HFO-1243zf), cis-1-chloro-3,3,3-trifluoropropene (1233zd(Z)) and trans-1-chloro-3,3,3-trifluoropropene (1233zd(E)) is provided as an example. Among these, 2,3,3,3-tetrafluoropropene (HFO-1234yf) is preferably used from the viewpoint of the stability of refrigerating machine oil under a refrigerant atmosphere and a reduction in GWP.

The amount of refrigerating machine oil contained in the working fluid composition for the refrigerating machine is not particularly restricted, and can be preferably 1 part by mass or more, more preferably 2 parts by mass or more, and also preferably 500 parts by mass or less, and more preferably 400 parts by mass or less with respect to 100 parts by mass of refrigerant.

The working fluid composition for the refrigerating machine according to the present embodiment is preferably used for a room air-conditioner having a reciprocating or rotary hermetic compressor, a cold store, or an open type or closed type car air-conditioner. The working fluid composition for the refrigerating machine and refrigerating machine oil according to the present embodiment are preferably used for e.g. a cooling system in a dehumidifier, a water heater, a freezer, a cold storage/refrigerated warehouse, a vending machine, a showcase, a chemical plant, etc. The working fluid composition for the refrigerating machine and refrigerating machine oil according to the present embodiment are also preferably used for a device provided with a centrifugal compressor.

EXAMPLES

The present invention will now be described in more detail by way of examples thereof. It should be noted however that the present invention is not limited to the following examples.

As base oils 1 to 9, polyol esters of a fatty acid(s) and a polyhydric alcohol having composition shown in Tables 1 and 2 were prepared. The abbreviated names in the tables represent the following compounds:

iC4: 2-methylpropanoic acid,
nC5: n-pentanoic acid,
iC8: 2-ethylhexanoic acid,
iC9: 3,5,5-trimethylhexanoic acid,
nC10: n-decanoic acid,
iC18: 2-ethylhexadecanoic acid,
nC22: docosanoic acid,
PET: pentaerythritol, and
DiPET: dipentaerythritol.

TABLE 1

|  |  | Base oil 1 | Base oil 2 | Base oil 3 | Base oil 4 |
|---|---|---|---|---|---|
| Fatty acid composition (mol %) | iC4 | — | 35 | — | — |
|  | nC5 | — | — | 40 | — |
|  | iC8 | 50 | — | — | — |
|  | iC9 | 50 | 65 | 60 | — |
|  | nC10 | — | — | — | 100 |
|  | iC18 | — | — | — | — |
|  | nC22 | — | — | — | — |
| Polyhydric alcohol |  | PET | PET | PET | PET |
| Carbon/oxygen mole ratio |  | 4.9 | 4.3 | 4.3 | 5.6 |

TABLE 2

|  |  | Base oil 5 | Base oil 6 | Base oil 7 | Base oil 8 | Base oil 9 |
|---|---|---|---|---|---|---|
| Fatty acid composition (mol %) | iC4 | — | — | 40 | — | — |
|  | nC5 | — | 80 | — | — | — |
|  | iC8 | 50 | — | — | — | 50 |
|  | iC9 | — | 20 | — | — | 50 |
|  | nC10 | — | — | — | — | — |
|  | iC18 | 50 | — | — | — | — |
|  | nC22 | — | — | 60 | 100 | — |
| Polyhydric alcohol |  | PET | PET | PET | PET | DiPET |
| Carbon/oxygen mole ratio |  | 7.1 | 3.5 | 8.0 | 11.6 | 4.7 |

In addition, the following base oils were used as base oils 10 to 12:

Base oil 10: a complex ester (an ester of adipic acid, butanediol, neopentyl glycol and isononanol, Carbon/oxygen mole ratio: 5.0), Base oil 11: a polyalkylene glycol (polypropylene glycol in which both terminals were methyl-etherified, weight average molecular weight: 1100, carbon/oxygen mole ratio: 2.9), and Base oil 12: a polyvinyl ether (a copolymer of ethylvinylether and isobutylvinylether, ethylvinylether/isobutylvinylether=7/1 (mole ratio), weight average molecular weight: 910, carbon/oxygen mole ratio: 4.3).

Test oils 1 to 24 having composition shown in Tables 3 to 6 were prepared using the base oils 1 to 12 and additives 1 to 4 described below:

Additive 1: glycidyl neodecanoate,

Additive 2: 2-ethylhexyl glycidyl ether,

Additive 3: tricresyl phosphate, and

Additive 4: 2,6-di-tert-butyl-p-cresol.

The stability test described below was carried out for each test oil. The results are shown in Tables 3 to 6.

(Stability Test)

The stability test was carried out in accordance with JIS K2211:2009 (Autoclave test). Specifically, 80 g of test oil in which the amount of moisture contained had been adjusted to 100 ppm was taken and put in an autoclave, and catalysts (iron, copper and aluminum wires, all with 1.6 mm in outer diameter×50 mm in length), and 20 g of cis-1-chloro-2,3,3,3-tetrafluoropropene (HCFO-1224yd(Z)) refrigerant was enclosed therein. The obtained sample was then heated to 140° C. and the acid value of a test oil after 160 hours was measured (JIS C2101:1999).

TABLE 3

|  |  | Test oil 1 | Test oil 2 | Test oil 3 | Test oil 4 | Test oil 5 | Test oil 6 |
|---|---|---|---|---|---|---|---|
| Test oil composition (mass %, based on total amount of test oil) | Base oil 1 | 100 | — | — | — | — | — |
|  | Base oil 2 | — | 100 | — | — | — | — |
|  | Base oil 3 | — | — | 100 | — | — | — |
|  | Base oil 4 | — | — | — | 100 | — | — |
|  | Base oil 5 | — | — | — | — | 100 | — |
|  | Base oil 6 | — | — | — | — | — | 100 |
| Stability Acid value (mg KOH/g) |  | 0.11 | 0.2 | 0.33 | 0.51 | 0.38 | 0.38 |

TABLE 4

|  |  | Test oil 7 | Test oil 8 | Test oil 9 | Test oil 10 | Test oil 11 | Test oil 12 |
|---|---|---|---|---|---|---|---|
| Test oil composition (mass %, based on total amount of test oil) | Base oil 7 | 100 | — | — | — | — | — |
|  | Base oil 8 | — | 100 | — | — | — | — |
|  | Base oil 9 | — | — | 100 | — | — | — |
|  | Base oil 10 | — | — | — | 100 | — | — |
|  | Base oil 11 | — | — | — | — | 100 | — |
|  | Base oil 12 | — | — | — | — | — | 100 |
| Stability Acid value (mg KOH/g) |  | 1.22 | 1.53 | 0.12 | 0.3 | 0.25 | 0.25 |

TABLE 5

|  |  | Test oil 13 | Test oil 14 | Test oil 15 | Test oil 16 | Test oil 17 | Test oil 18 |
|---|---|---|---|---|---|---|---|
| Test oil composition (mass %, based on total amount of test oil) | Base oil 1 | 99.5 | — | — | — | — | — |
|  | Base oil 2 | — | 99.5 | — | — | — | — |
|  | Base oil 3 | — | — | 99.4 | — | — | — |
|  | Base oil 4 | — | — | — | 99.5 | — | — |
|  | Base oil 5 | — | — | — | — | 99.5 | — |
|  | Base oil 6 | — | — | — | — | — | 99.4 |
|  | Additive 1 | 0.1 | 0.1 | 0.5 | 0.1 | 0.1 | 0.5 |
|  | Additive 2 | 0.1 | 0.1 | — | 0.1 | 0.1 | — |
|  | Additive 3 | 0.1 | 0.1 | — | 0.1 | 0.1 | — |
|  | Additive 4 | 0.2 | 0.2 | 0.1 | 0.2 | 0.2 | 0.1 |
| Stability Acid value (mg KOH/g) |  | <0.05 | <0.05 | <0.05 | <0.05 | <0.05 | <0.05 |

TABLE 6

|  |  | Test oil 19 | Test oil 20 | Test oil 21 | Test oil 22 | Test oil 23 | Test oil 24 |
|---|---|---|---|---|---|---|---|
| Test oil composition (mass %, based on total amount of test oil) | Base oil 7 | 99.5 | — | — | — | — | — |
|  | Base oil 8 | — | 99.5 | — | — | — | — |
|  | Base oil 9 | — | — | 99.5 | — | — | — |
|  | Base oil 10 | — | — | — | 99.5 | — | — |
|  | Base oil 11 | — | — | — | — | 99.5 | — |
|  | Base oil 12 | — | — | — | — | — | 99.5 |
|  | Additive 1 | 0.1 | 0.1 | 0.1 | 0.1 | 0.1 | 0.1 |
|  | Additive 2 | 0.1 | 0.1 | 0.1 | 0.1 | 0.1 | 0.1 |
|  | Additive 3 | 0.1 | 0.1 | 0.1 | 0.1 | 0.1 | 0.1 |
|  | Additive 4 | 0.2 | 0.2 | 0.2 | 0.2 | 0.2 | 0.2 |
| Stability Acid value (mg KOH/g) |  | 0.6 | 0.7 | <0.05 | <0.05 | <0.05 | <0.05 |

In addition, the testing for compatibility with refrigerant described below was carried out for the test oils 1 to 12, and all the test oils were verified to be compatible with a refrigerant.

(Refrigerant Compatibility Test)

In accordance with "Test method for compatibility with refrigerant" in "Refrigerating machine oils" in JIS K2211: 2009, 10 g of test oil was blended with 10 g of cis-1-chloro-2,3,3,3-tetrafluoropropene (HCFO-1224yd(Z)) refrigerant, and the blend was observed whether the refrigerant and refrigerating machine oil were compatible with each other at 0° C.

The invention claimed is:

1. A working fluid composition for a refrigerating machine, comprising:
   a refrigerant comprising 1-chloro-2,3,3,3-tetrafluoropropene, and
   a refrigerating machine oil comprising
      a base oil, and
      an additive;
      wherein the base oil comprises an oxygen-containing oil having a carbon/oxygen molar ratio of 2.5 or more and 7.5 or less and
      wherein the additive comprises an acid scavenger comprising at least one selected from the group consisting of a glycidyl ether epoxy compound, a glycidyl ester epoxy compound, an oxirane compound, an alkyloxirane compound, an alicyclic epoxy compound, an epoxidized fatty acid monoester, and an epoxidized vegetable oil.

2. The working fluid composition according to claim 1, wherein the oxygen-containing oil comprises an ester of a fatty acid and a polyhydric alcohol, wherein a ratio of C4-C20 fatty acids in the fatty acid is from 20 to 100% by mole.

3. The working fluid composition according to claim 2, wherein the polyhydric alcohol comprises at least one selected from the group consisting of neopentyl glycol, trimethylolethane, trimethylolbutane, di-(trimethylolpropane), tri-(trimethylolpropane), pentaerythritol, and dipentaerythritol.

4. The working fluid composition according to claim 3, wherein the fatty acid comprises at least one selected from the group consisting of butanoic acid, pentanoic acid, hexanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, 2-methylpropanoic acid, 2-methylbutanoic acid, 2-methylpentanoic acid, 2-methylhexanoic acid, 2-methylheptanoic acid, 2-ethylhexanoic acid, and 3,5,5-trimethylhexanoic acid.

5. The working fluid composition according to claim 2, wherein the polyhydric alcohol comprises at least one selected from the group consisting of pentaerythritol and dipentaerythritol, and
the fatty acid comprises at least one selected from the group consisting of pentanoic acid, 2 methylpropanoic acid, and 3,5,5-trimethylhexanoic acid.

6. The working fluid composition according to claim 1, wherein the carbon/oxygen molar ratio of the oxygen-containing oil is 4.3 or more and 5.0 or less.

7. The working fluid composition according to claim 1, wherein the additive comprises an acid scavenger comprising at least one selected from the group consisting of a glycidyl ether epoxy compound, and a glycidyl ester epoxy compound.

8. The working fluid composition according to claim 7, wherein the glycidyl ether epoxy compound comprises at least one selected from the group consisting of n-butylphenylglycidyl ether, i-butylphenylglycidyl ether, sec-butylphenylglycidyl ether, tert-butylphenylglycidyl ether, pentylphenylglycidyl ether, hexylphenylglycidyl ether, heptylphenylglycidyl ether, octylphenylglycidyl ether, nonylphenylglycidyl ether, decylphenylglycidyl ether, decyl glycidyl ether, undecyl glycidyl ether, dodecyl glycidyl ether, tridecyl glycidyl ether, tetradecyl glycidyl ether, 2-ethylhexyl glycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, a polyalkylene glycol monoglycidyl ether, and a polyalkylene glycol diglycidyl ether; and
the glycidyl ester epoxy compound comprises at least one selected from the group consisting of glycidyl benzoate, glycidyl neodecanoate, glycidyl-2,2-dimethyl octanoate, glycidyl acrylate, and glycidyl methacrylate.

9. The working fluid composition according to claim 7, wherein the additive comprises an antioxidant comprising at least one selected from the group consisting of a phenol compound and an amine compound.

10. The working fluid composition according to claim 9, wherein
the phenol compound comprises di-tert-butyl-p-cresol, and
the amine compound comprises an alkyldiphenylamine.

11. The working fluid composition according to claim 10, wherein the content of the antioxidant is 0.02 mass % or more and 0.5 mass % or less based on the total amount of the refrigerating machine oil.

12. The working fluid composition according to claim 7, wherein the content of the acid scavenger is 0.1 mass % or more and 0.5 mass % or less based on the total amount of the refrigerating machine oil.

13. The working fluid composition according to claim 1, wherein the content of the oxygen-containing oil is 95 mass % or more based on the total amount of the base oil.

14. The working fluid composition according to claim 7, wherein the content of 1-chloro-2,3,3,3-tetrafluoropropene is 20 mass % or more based on the total amount of the refrigerant.

\* \* \* \* \*

UNITED STATES PATENT AND TRADEMARK OFFICE
CERTIFICATE OF CORRECTION

PATENT NO. : 10,759,982 B2
APPLICATION NO. : 16/077922
DATED : September 1, 2020
INVENTOR(S) : Y. Shono et al.

Page 1 of 1

It is certified that error appears in the above-identified patent and that said Letters Patent is hereby corrected as shown below:

In the Claims

Column 23, Line 12 (Claim 5, Line 6) please change "2 methylpropanoic" to -- 2-methylpropanoic --

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*